United States Patent
Hino et al.

(10) Patent No.: US 9,310,607 B2
(45) Date of Patent: Apr. 12, 2016

(54) ACTUATOR, MANUFACTURING METHOD OF ACTUATOR, LIGHT SCANNER AND IMAGE FORMING APPARATUS

(75) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 218 days.

(21) Appl. No.: 13/231,192

(22) Filed: Sep. 13, 2011

(65) Prior Publication Data

US 2012/0120458 A1 May 17, 2012

(30) Foreign Application Priority Data

Nov. 16, 2010 (JP) ................................. 2010-256243

(51) Int. Cl.
*G02B 26/08* (2006.01)

(52) U.S. Cl.
CPC ......... *G02B 26/085* (2013.01); *Y10T 74/18056* (2015.01)

(58) Field of Classification Search
CPC . G02B 26/085; G02B 26/105; G02B 26/0833
USPC .............. 310/36, 38; 359/224.1, 225.1, 199.3
See application file for complete search history.

(56) References Cited

U.S. PATENT DOCUMENTS

| | | | |
|---|---|---|---|
| 7,061,063 B2 | 6/2006 | Kato et al. | |
| 7,362,488 B2 * | 4/2008 | Yasuda et al. | 359/224.1 |
| 2002/0113675 A1 | 8/2002 | Kato et al. | |
| 2002/0114053 A1 | 8/2002 | Yasuda et al. | |
| 2005/0046918 A1 | 3/2005 | Yasuda et al. | |
| 2006/0209378 A1 | 9/2006 | Yasuda et al. | |
| 2007/0144867 A1 * | 6/2007 | Torashima et al. | 198/346.1 |
| 2007/0242328 A1 | 10/2007 | Yasuda et al. | |

(Continued)

FOREIGN PATENT DOCUMENTS

| | | |
|---|---|---|
| JP | 2002-321197 A | 11/2002 |
| JP | 2002-321198 A | 11/2002 |
| JP | 2003-207729 A | 7/2003 |

(Continued)

OTHER PUBLICATIONS

"step, n. 1." OED Online. Oxford University Press, Sep. 2014. Web. Oct. 16, 2014.*

*Primary Examiner* — Thomas Truong
(74) *Attorney, Agent, or Firm* — Harness, Dickey & Pierce, P.L.C.

(57) ABSTRACT

An actuator includes a light reflection part having light reflectivity, a movable part having the light reflection part and being rotatable around a rotation center axis, a pair of connection parts connected to the movable part, and a support part that supports the pair of connection parts, and each of the connection parts includes a pair of beam members, a distance between the pair of beam members gradually increases from a first surface side toward a second surface side of the movable part when seen from a direction in parallel to the rotation center axis of the movable part, and given that a distance between ends at the first surface side of the pair of beam members is $W_1$ and a thickness of the pair of beam members in a thickness direction of the movable part is t, the following expression (1) is satisfied.

$$w_1 < \frac{t}{\tan 54.73°} \quad (1)$$

5 Claims, 10 Drawing Sheets

(56) References Cited

U.S. PATENT DOCUMENTS

2009/0231653 A1* 9/2009 Nakamura et al. ......... 359/198.1
2010/0177369 A1* 7/2010 Kato et al. ................. 359/213.1

FOREIGN PATENT DOCUMENTS

| JP | 2004-034256 | 2/2004 |
| JP | 2010-079243 | 4/2010 |

* cited by examiner

ACTUATOR, MANUFACTURING METHOD OF ACTUATOR, LIGHT SCANNER AND IMAGE FORMING APPARATUS

BACKGROUND

1. Technical Field

The present invention relates to an actuator, a manufacturing method of an actuator, a light scanner, and an image forming apparatus.

2. Related Art

As an actuator, an actuator using a structure forming a torsional vibrator has been known (for example, see Patent Document 1 (JP-A-2010-79243)).

For example, Patent Document 1 discloses a light deflector having a movable plate, a support frame (support part), a pair of elastic support parts (connection parts) that support the movable plate torsionally rotatable with respect to the support frame, each elastic support part including two bars (beam members).

The movable plate, the support frame, and the pair of elastic support parts are integrally formed by anisotropic etching of a silicon substrate with a principal surface formed by the (100) surface of silicon.

After masks having opening are respectively formed on both surfaces of the silicon substrate, the anisotropic etching is performed via the masks. The outer shapes of the cross-sections of the respective bars of the elastic support parts formed as above form parallelograms with pairs of sides along the (100) surface of silicon and pairs of sides along the (111) surface of silicon.

However, in related art, due to misalignment between the front and rear masks of the silicon substrate, level differences are respectively produced on the pair of side surfaces that should be formed by the (111) surface of the respective bars of the elastic support parts, and the level difference on one side surface and the level difference on the other side surface are located in the same position in the thickness direction of the silicon substrate. Accordingly, stress is easily concentrated on parts of the respective bars of the elastic support parts and breakage may be caused.

SUMMARY

An advantage of some aspects of the invention is to provide an actuator that can prevent breakage due to stress concentration at driving relatively easily, a manufacturing method of an actuator, a light scanner, and an image forming apparatus.

An actuator according to an aspect of the invention includes a movable part rotatable around a rotation center axis, a pair of connection parts connected to the movable part, and a support part that supports the pair of connection parts, wherein each of the connection parts includes a pair of beam members, a distance between the pair of beam members gradually increases from a first surface side toward a second surface side of the movable part when seen from a direction in parallel to the rotation center axis of the movable part, and, given that a distance between ends at the first surface side of the pair of beam members is $W_1$ and a thickness of the pair of beam members in a thickness direction of the movable part is t, the following expression (1) is satisfied.

$$w_1 < \frac{t}{\tan 54.73°} \tag{1}$$

According to the actuator of the aspect of the invention, when the movable part, the support part, and the pair of connection parts are formed by anisotropic etching of the silicon substrate with the plate surface formed by the (100) surface of silicon from both surface sides, if the formation positions of the masks formed on both surfaces of the silicon substrate are misaligned and thereby level differences are produced on pairs of side surfaces that should be formed by the (111) surfaces of silicon of the respective beam members, the level difference formed on one side surface and the level difference formed on the other side surface may be shifted in the thickness direction of the silicon substrate. Accordingly, stress concentration generated in the respective beam members at rotation of the movable part may be relaxed.

In this manner, the actuator according to the aspect of the invention can prevent breakage due to stress concentration at driving relatively easily.

In the actuator according to the aspect of the invention, it is preferable that, given that a distance between ends at the second surface side of the pair of beam members is $W_2$, the following expression (2) is satisfied.

$$t < \frac{\tan 54.73°}{2}(w_1 + w_2) \tag{2}$$

Thereby, the silicon substrate with the plate surface formed by the (100) surface of silicon is anisotropically etched from both surface sides, the connection part including the pair of beam members may be easily and reliably formed.

In the actuator according to the aspect of the invention, it is preferable that the movable part, the support part, and the pair of connection parts are formed by anisotropic etching of the silicon substrate having the plate surface formed by the (100) surface of silicon.

In the anisotropic etching, the movable part, the support part, and the pair of connection parts may be easily formed with high accuracy using the (111) surface of silicon.

In the actuator according to the aspect of the invention, it is preferable that each of the beam members has a sectional shape of a parallelogram when seen from the direction in parallel to the rotation center axis.

The respective beam members having the sectional shapes may be easily and reliably formed by anisotropic etching of the silicon substrate having the plate surface formed by the (100) surface of silicon.

In the actuator according to the aspect of the invention, it is preferable that an outer shape of the sectional shape of each of the beam members is formed by a pair of sides along the (100) surface of silicon and a pair of sides along the (111) surface of silicon.

The respective beam members having the cross-sectional shapes may be easily and reliably formed by anisotropic etching of the silicon substrate having the plate surface formed by the (100) surface of silicon.

A manufacturing method of an actuator according to another aspect of the invention is a method of manufacturing the actuator according to the aspect of the invention, the actuator includes a movable part rotatable around a rotation center axis, a pair of connection parts connected to the movable part, and a support part that supports the pair of connection parts, each of the connection parts including a pair of beam members and a distance between the pair of beam members gradually increasing from a first surface side toward a second surface side of the movable part when seen from a direction in parallel to the rotation center axis of the movable part, and the method includes forming a first mask having a first opening corresponding to a part between ends at the first surface side of the pair of beam members on one surface of a silicon substrate having a plate surface formed by the (100) surface of silicon and forming a second mask having a second opening corresponding to a part between ends at the other surface side of the pair of beam members on the other surface of the silicon substrate, and forming the movable part, the support part and the pair of connection parts by anisotropically etching the silicon substrate from both surface sides via the first mask and the second mask, wherein, given that a width of the first opening is $W_{m1}$ and a thickness of the silicon substrate is T, a relation of the following expression (3) is satisfied.

$$w_{m1} < \frac{T}{\tan 54.73°} \quad (3)$$

According to the manufacturing method of an actuator according to the aspect of the invention, if the positional relation between the first mask and the second mask is misaligned and thereby level differences are produced on pairs of side surfaces that should be formed by the (111) surfaces of silicon of the respective beam members, the level difference formed on one side surface and the level difference formed on the other side surface may be shifted in the thickness direction of the silicon substrate. Accordingly, stress concentration generated in the respective beam members at rotation of the movable part may be relaxed in the obtained actuator.

In the manufacturing method of an actuator according to the aspect of the invention, it is preferable that, given that a width of the second opening is $W_{m2}$, the following expression (4) is satisfied.

$$T < \frac{\tan 54.73°}{2}(w_{m1} + w_{m2}) \quad (4)$$

Thereby, the silicon substrate with the plate surface formed by the (100) surface of silicon is anisotropically etched from both surface sides, and the connection part including the pair of beam members may be easily and reliably formed.

A light scanner according to still another aspect of the invention includes a light reflection part having light reflectivity, a movable plate having the light reflection part and being rotatable around a rotation center axis, a pair of connection parts connected to the movable part, and a support part that supports the pair of connection parts, wherein each of the connection parts includes a pair of beam members, a distance between the pair of beam members gradually increases from a first surface side toward a second surface side of the movable part when seen from a direction in parallel to the rotation center axis of the movable part, and, given that a distance between ends at the first surface side of the pair of beam members is $W_1$ and a thickness of the pair of beam members in a thickness direction of the movable plate is t, the following expression (1) is satisfied.

$$w_1 < \frac{t}{\tan 54.73°} \quad (1)$$

The light scanner according to the aspect of the invention can prevent breakage due to stress concentration at driving relatively easily.

In the light scanner according to the aspect of the invention, it is preferable that, given that a distance between ends at the second surface side of the pair of beam members is $W_2$, the following expression (2) is satisfied.

$$t < \frac{\tan 54.73°}{2}(w_1 + w_2) \quad (2)$$

Thereby, the silicon substrate with the plate surface formed by the (100) surface of silicon is anisotropically etched from both surface sides, and the connection part including the pair of beam members may be easily and reliably formed.

In the light scanner according to the aspect of the invention, it is preferable that the movable part, the support part, and the pair of connection parts are formed by anisotropic etching of the silicon substrate having the plate surface formed by the (100) surface of silicon.

In the anisotropic etching, the movable part, the support part, and the pair of connection parts may be easily formed with high accuracy using the (111) surface of silicon.

In the light scanner according to the aspect of the invention, it is preferable that each of the beam members has a sectional shape of a parallelogram when seen from the direction in parallel to the rotation center axis.

The respective beam members having the sectional shapes may be easily and reliably formed by anisotropic etching of the silicon substrate having the plate surface formed by the (100) surface of silicon.

In the light scanner according to the aspect of the invention, it is preferable that an outer shape of the sectional shape of each of the beam members is formed by a pair of sides along the (100) surface of silicon and a pair of sides along the (111) surface of silicon.

The respective beam members having the cross-sectional shapes may be easily and reliably formed by anisotropic etching of the silicon substrate having the plate surface formed by the (100) surface of silicon.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, preferred embodiments of an actuator, a manufacturing method of an actuator, a light scanner, and an image forming apparatus of the invention will be explained with reference to the accompanying drawings. In the embodiments, explanation will be made by taking the case where the actuator of the invention is applied to a light scanner as an example.

First Embodiment

First, the first embodiment of a light scanner of the invention will be explained.

Figure 1:
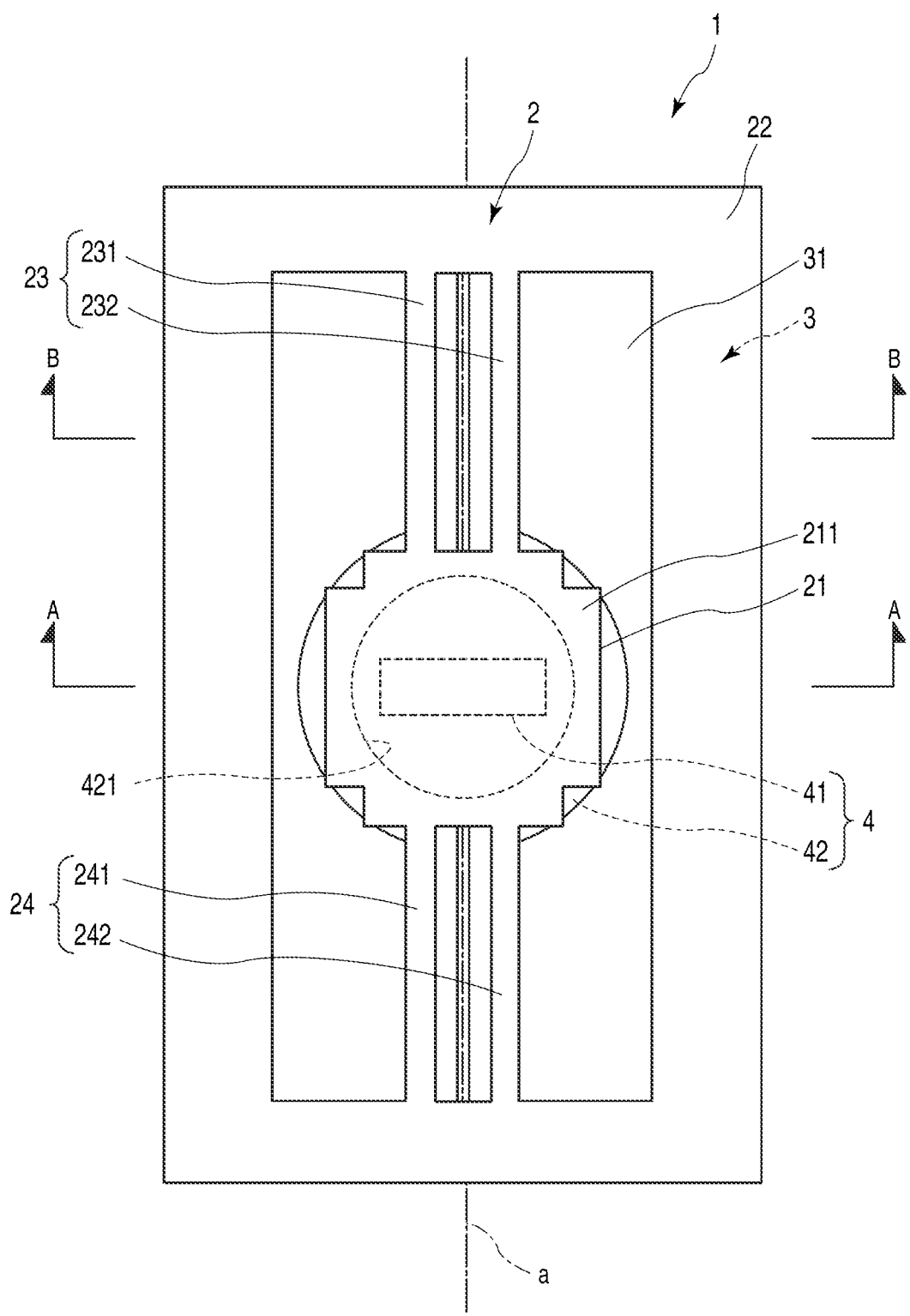
FIG. 1 is a plan view showing a light scanner according to an embodiment of the invention.
Figure 2:
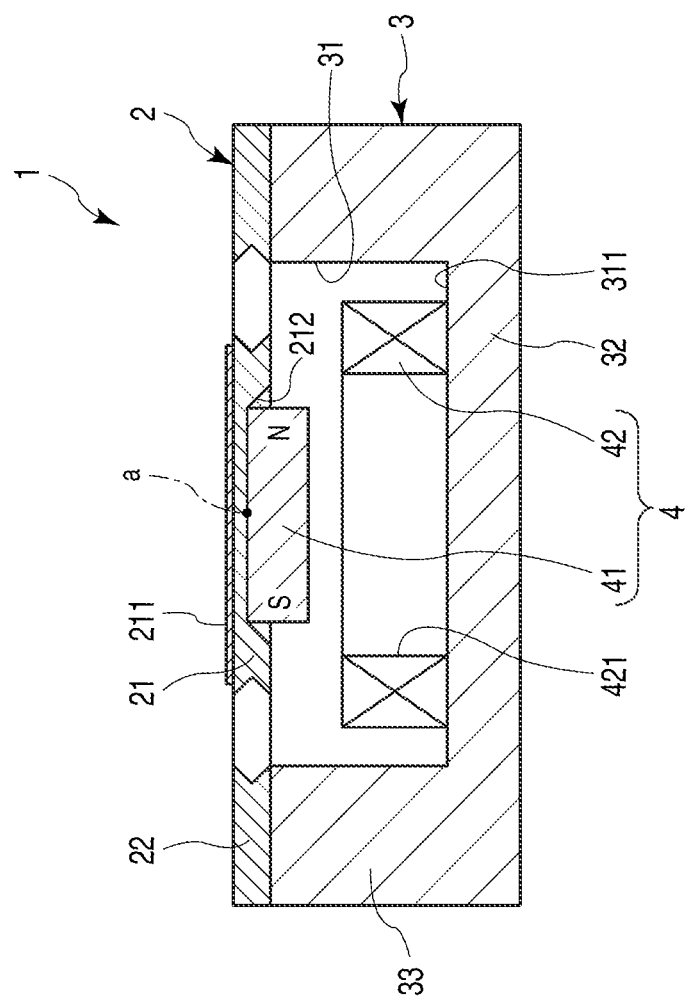
FIG. 2 is a sectional view along A-A line in FIG. 1.
Figure 3:
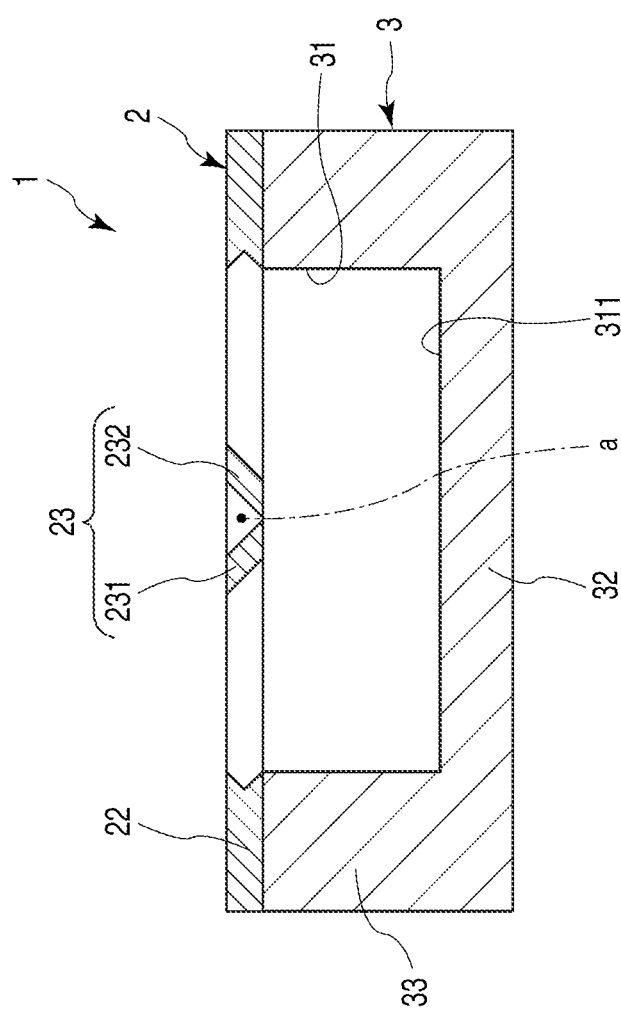
FIG. 3 is a sectional view along B-B line in FIG. 1.
Figure 4:
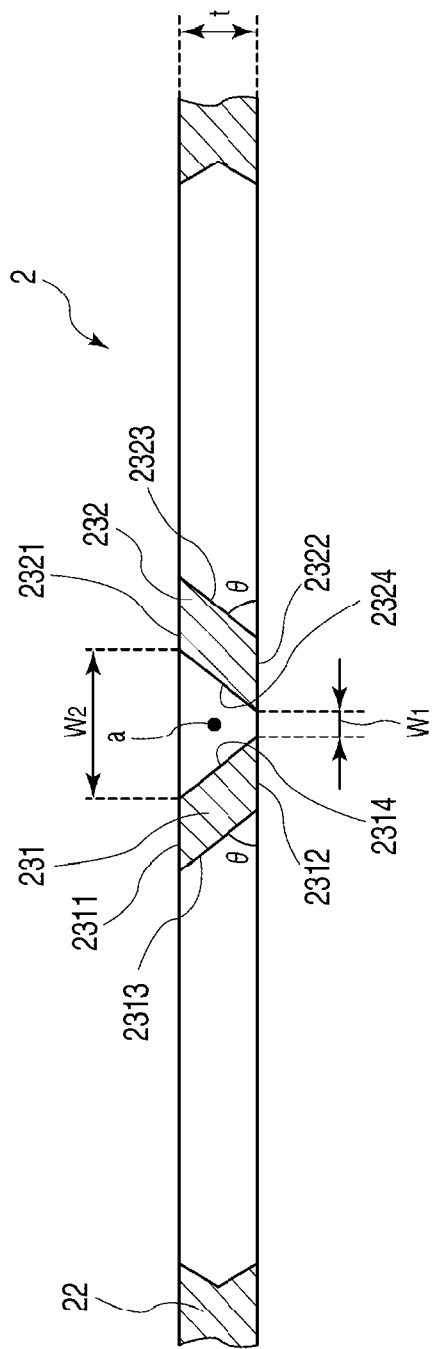
FIG. 4 is a partially expanded sectional view of FIG. 3.
Figure 6A:
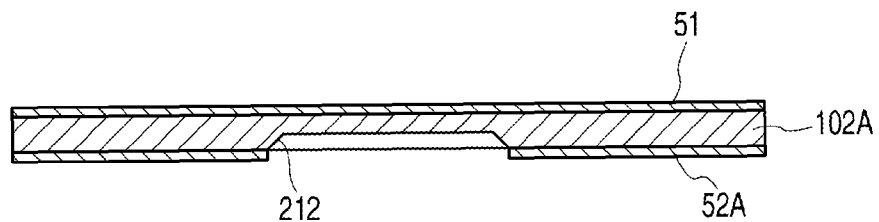
FIGS. 6A to 6G are sectional views for explanation of the manufacturing method of the light scanner shown in FIG. 1.
Figure 6B:
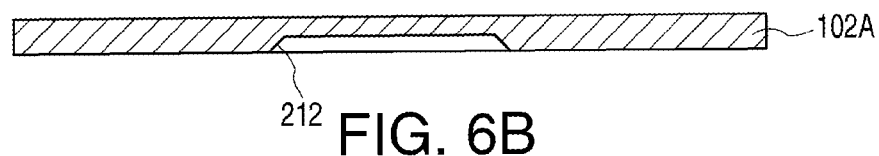
Figure 6C:
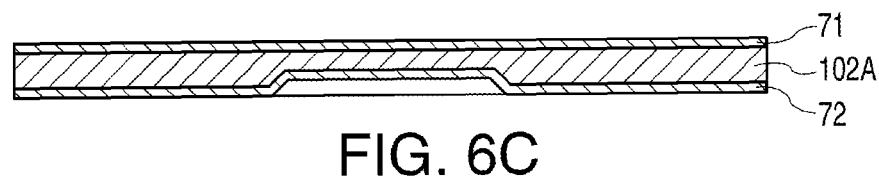
Figure 6D:
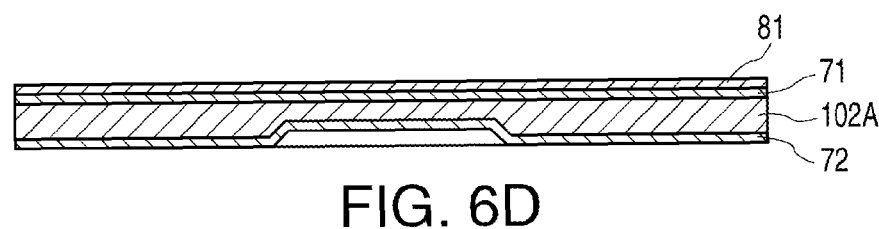
Figure 6E:
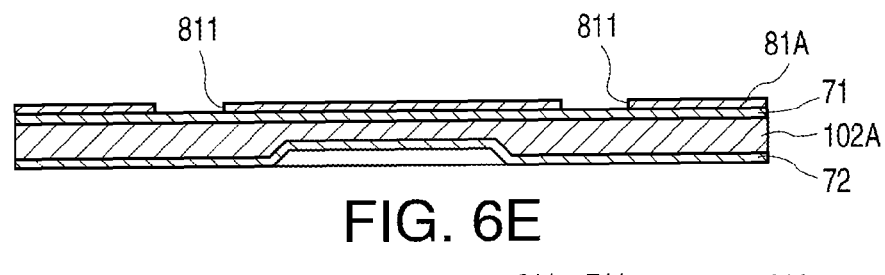
Figure 6F:
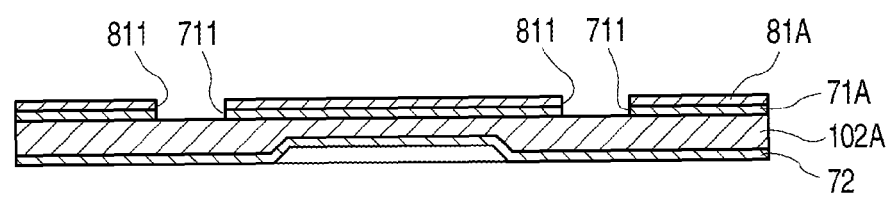
Figure 6G:
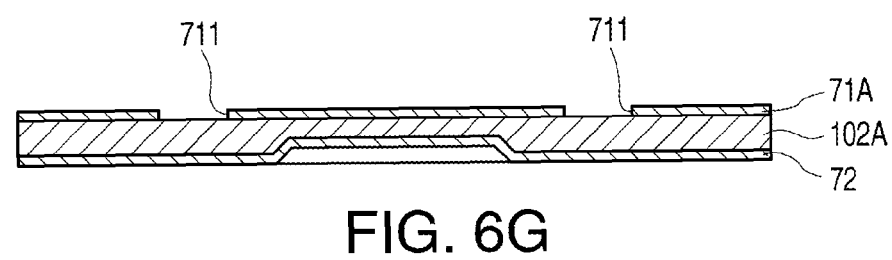
Figure 7A:
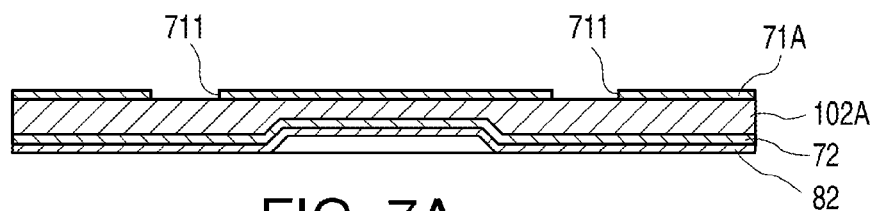
FIGS. 7A to 7G are sectional views for explanation of the manufacturing method of the light scanner shown in FIG. 1.
Figure 7B:
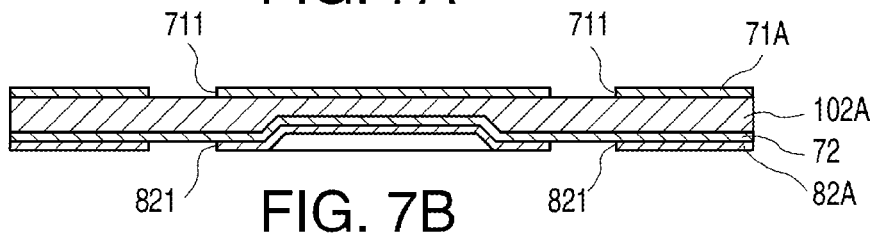
Figure 7C:
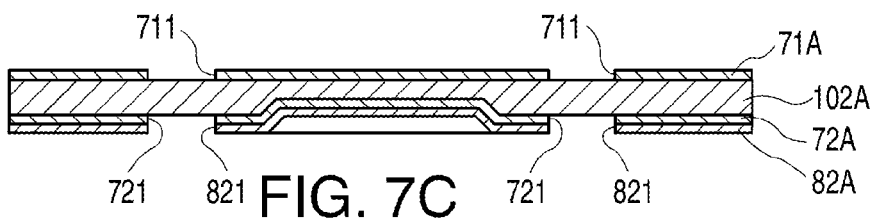
Figure 7D:
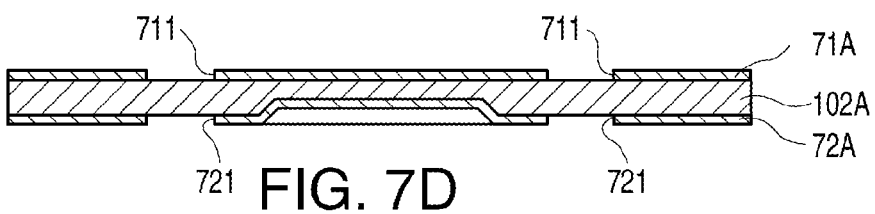
Figure 7E:
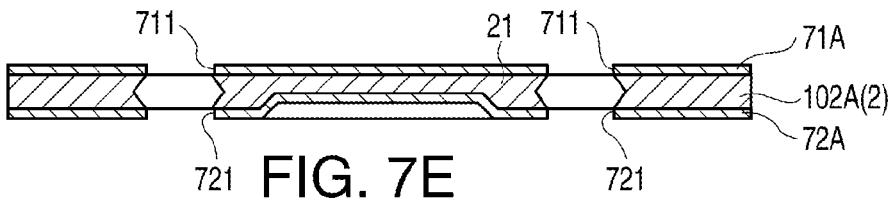

FIG. 1 is a plan view showing a light scanner according to an embodiment of the invention, FIG. 2 is a sectional view along A-A line in FIG. 1, FIG. 3 is a sectional view along B-B line in FIG. 1, FIG. 4 is a partially expanded sectional view of FIG. 3, FIGS. 5A to 7G are sectional views for explanation of a manufacturing method of the light scanner shown in FIG. 1, FIGS. 8A to 8D are diagrams for explanation of formation of connection parts (without misalignment of masks) at an etching step shown in FIG. 7E, and FIGS. 9A to 9D are diagrams for explanation of formation of connection parts (with misalignment of masks) at an etching step shown in FIG. 7E. As below, for convenience of explanation, the upper sides in FIGS. 2 to 9D are referred to "upside" and the lower sides are referred to as "downside".

As shown in FIG. 1, the light scanner 1 has a base 2 having a vibration system, a support 3 that supports the base 2, and a driving unit 4 for vibrating the vibration system of the base 2.

Further, the base 2 has a movable plate (movable part) 21 on which a light reflection part 211 is provided, a support part 22 that supports the movable plate 21, and a pair of connection parts 23, 24 that connect the movable plate 21 and the support part 22.

In the light scanner 1, the movable plate 21 is rotated while the respective connection parts 23, 24 are torsionally deformed by driving force of the driving unit 4. Thereby, scanning is performed with the light reflected by the light reflection part 211 in a predetermined one direction.

As below, the respective parts forming the light scanner 1 will be sequentially explained in detail.

Base

As described above, the base 2 has the movable plate 21 on which the light reflection part 211 is provided, the support part 22 that supports the movable plate 21, and the pair of connection parts 23, 24 that connect the movable plate 21 and the support part 22.

The base 2 is formed using silicon as a main material, and the movable plate 21, the support part 22, and the connection parts 23, 24 are integrally formed. More specifically, as will be described in detail later, the base 2 is formed by anisotropic etching of a silicon substrate with a plate surface formed by the (100) surface of silicon. By the anisotropic etching, the movable plate 21, the support part 22, and the pair of connection parts 23, 24 may be easily formed with high accuracy using the (111) surface of silicon.

Further, the upper surface and the lower surface of the base 2 are respectively formed by the (100) surface of silicon. Furthermore, the inner periphery surface of the support part 22, the side surface of the movable plate 21, and the main parts of the side surfaces of the respective connection parts 23, 24 (the parts in parallel and perpendicular to an axis line a in the plan view) are respectively formed by the (111) surfaces of silicon.

In addition, since fatigue like in metal materials is not caused in silicon, by forming the base 2 using silicon as the main material, the base 2 having an advantageous vibration property may be obtained. Further, silicon can be worked in high-precision dimension accuracy by etching as will be described later, and, by forming the base 2 using the silicon substrate, the base 2 having a desired shape (desired vibration property) may be obtained.

As below, the base 2 will be explained further in detail.

The support part 22 has a frame shape as shown in FIG. 2. More specifically, the support part 22 has a square annular shape. The support part 22 supports the movable plate 21 via the pair of connection parts 23, 24. The shape of the support part 22 is not particularly limited as long as it may support the movable plate 21 via the pair of connection parts 23, 24. For example, a shape divided in correspondence with the respective connection parts 23, 24 may be employed.

The movable plate 21 is provided inside of the support part 22.

The movable plate 21 has a plate shape. Further, in the embodiment, the movable plate 21 has a shape of a rectangle without four corners (cross-like shape) in the plan view. Thereby, the moment of inertia at rotation of the movable plate 21 may be reduced while the area of the light reflection part 211 of the upper surface (second surface) of the movable plate 21 is made sufficient.

Note that the shape of the movable plate 21 in the plan view is not limited to the above described shape, however, for example, a circular shape, an oval shape, a polygonal shape such as a square shape, a pentagonal shape, or a hexagonal shape, an irregular shape, or the like may be employed.

On the upper surface of the movable plate 21, the light reflection part 211 having light reflectivity is provided. On the other hand, on the lower surface of the movable plate 21, a permanent magnet 41 of the driving unit 4, which will be described later, is provided. The permanent magnet 41 will be described later in detail.

The respective connection parts 23, 24 have longitudinal shapes and are formed to be elastically deformable. Further, the connection part 23 and the connection part 24 are symmetrically provided with respect to the movable plate 21. The connection parts 23, 24 respectively connect the movable plate 21 and the support part 22 so that the movable plate 21 may be rotatable with respect to the support part 22. The pair of connection parts 23, 24 are coaxially provided along the axis line a and the movable plate 21 rotates with respect to the support part 22 around the axis line a as a rotation center axis.

In the embodiment, as shown in FIG. 1, the connection part 23 includes a pair of beam members 231, 232. Similarly, the connection part 24 includes a pair of beam members 241, 242. As below, the connection part 23 will be representatively explained, and the explanation of the connection part 24 will be omitted because the connection part 24 is the same as the connection part 23.

The respective beam members 231, 232 are provided along the axis line a and opposed with respect to the axis line a. Further, the respective beam members 231, 232 have cross-sections of parallelograms.

More specifically, the outer shapes of the cross-sections of the respective beam members 231, 232 have parallelograms formed by pairs of sides along the (100) surface of silicon and pairs of sides along the (111) surface of silicon. That is, the beam member 231 has an upper surface 2311 and a lower surface 2312 respectively formed by the (100) surfaces of silicon and a pair of side surfaces 2313, 2314 respectively formed by the (111) surfaces of silicon. Similarly, the beam member 232 has an upper surface 2321 and a lower surface 2322 respectively formed by the (100) surfaces of silicon and a pair of side surfaces 2323, 2324 respectively formed by the (111) surfaces of silicon. Here, the side surfaces 2313, 2314, 2323, 2324 are respectively formed by the (111) surfaces of silicon, and thus, tilt angles θ relative to the upper surface or the lower surface of the base 2 (i.e., the (100) surface of silicon) are 54.73°. The respective beam members 231, 232 having the cross-sectional shapes may be easily and reliably formed by anisotropic etching of the silicon substrate with the plate surface formed by the (100) surface of silicon.

Further, the beam members 231, 232 have symmetric shapes with respect to a line segment vertically extending and passing through the axis line a when seen from a direction in parallel to the axis line a (in other words, seen in the section shown in FIG. 4).

Furthermore, in the section shown in FIG. 4, the entire width of the connection part 23 becomes larger from the lower side toward the upper side. In addition, in the section shown in FIG. 4, the distance between the beam member 231 and the beam member 232 (the distance between the gap) becomes larger from the lower side toward the upper side.

That is, the distance between the pair of beam members 231, 232 gradually increases from one surface side (first surface side) toward the other surface side (second surface side) of the movable plate 21 when seen from a direction parallel to the rotation center axis of the movable plate 21 (from the lower side toward the upper side in the embodiment).

Further, given that a distance between the lower ends of the pair of beam members 231, 232 is $W_1$ and a thickness of the pair of beam members 231, 232 in the thickness direction of the movable plate 21 is t, the following expression (1) is satisfied.

$$w_1 < \frac{t}{\tan 54.73°} \quad (1)$$

If the expression (1) is satisfied, as will be described later in detail, when the movable plate 21, the support part 22, and the pair of connection parts 23, 24 are formed by anisotropic etching of the silicon substrate with the plate surface formed by the (100) surface of silicon from both surface sides, the formation positions of the masks formed on both surfaces of the silicon substrate are misaligned. Even if level differences are produced on the pair of side surfaces 2313, 2314, 2323, 2324 that should be formed by the (111) surfaces of silicon of the respective beam members 231, 232, the level difference formed on one side surface and the level difference formed on the other side surface may be shifted in the thickness direction of the silicon substrate (see FIGS. 9A to 9D). Accordingly, stress concentration generated in the respective beam members 231, 232 at rotation of the movable plate 21 may be relaxed.

In this manner, the light scanner 1 can prevent breakage due to stress concentration at driving relatively easily.

Further, given that a distance between upper ends of the pair of beam members 231, 232 is $W_2$, the following expression (2) is satisfied.

$$t < \frac{\tan 54.73°}{2}(w_1 + w_2) \quad (2)$$

Therefore, by anisotropic etching of the silicon substrate with the plate surface formed by the (100) surface of silicon from the both surface sides, the connection part 23 including the pair of beam members 231, 232 may be easily and reliably formed.

Support

The support 3 has a function of supporting the above described base 2. Further, the support 3 also has a function of supporting a coil 42 of the driving unit 4, which will be described later.

The support 3 has a box shape having a recessed part 31 opening upward. In other words, the support 3 includes a plate-like part 32 having a plate shape and a frame-like part 33 having a frame shape provided along the outer peripheral part of the upper surface of the plate-like part 32.

Of the upper surface of the support 3, to a part outside of the recessed part 31, i.e., the upper surface of the frame-like part 33, the lower surface of the support part 22 of the above described base 2 is bonded. Thereby, a space allowing for rotation of the movable plate 21 is formed between the movable plate 21 and the pair of connection parts 23, 24 of the base 2 and the support 3.

Constituent materials of the support 3 include, but are not particularly limited to, for example, a glass material such as quartz glass, Pyrex glass ("Pyrex" is a trademark), and Tempax glass, a silicon material such as single-crystal silicon and polysilicon, LTCC (low-temperature sintering ceramics), etc.

Further, the bonding method of the base 2 and the support 3 is appropriately determined in response to the constituent material, the shape, and the like of the support 3, and the methods include, but are not particularly limited to a method using an adhesive material, anodic bonding, direct bonding, etc.

Driving Unit

The driving unit 4 has the permanent magnet 41 and the coil 42 and rotationally drives the above described movable plate 21 of the base 2 using an electromagnetic driving system (more specifically, a moving magnet-type electromagnetic driving system). The electromagnetic driving system can generate large driving force. Therefore, according to the driving unit 4 employing the electromagnetic driving system, the deflection angle of the movable plate 21 may be made larger while the lower drive voltage is realized.

The permanent magnet 41 is fixed to the lower surface of the movable plate 21 via an adhesive agent, for example. Further, the permanent magnet 41 has a longitudinal shape and is provided to extend in a direction orthogonal to the axis line a in the plan view. The permanent magnet 41 is magnetized in the longitudinal direction and one end side in the longitudinal direction is an S-pole and the other end side is an N-pole. By providing the permanent magnet 41 to extend in the direction orthogonal to the axis line a, both ends of the permanent magnet 41 may be located separately from the axis line a. Accordingly, through the action of the magnetic field generated by the coil 42, large torque may be provided by the movable plate 21.

As the permanent magnet 41, magnetized hard magnetic materials including, but not limited to, for example, a neodymium magnet, a ferrite magnet, a samarium-cobalt magnet, an alnico magnet, and a bond magnet may be preferably used.

The coil 42 is provided on a bottom surface 311 of the recessed part 31 of the support 3 so as to be opposed to the movable plate 21. Thereby, the magnetic field generated by the coil 42 may be effectively allowed to act on the permanent magnet 41. The coil 42 is electrically connected to a power supply (not shown), and periodically changing voltages (alternating-current voltages, intermittent direct-current voltages, or the like) may be applied thereto from the power supply.

By the driving unit 4, the movable plate 21 rotates in the following manner.

First, for example, alternating-current voltages are applied to the coil 42 using a power supply (not shown). Thereby, a first electric field with the upper side (the movable plate 21 side) of the coil 42 as an N-pole and the lower side as an S-pole and a second electric field with the upper side of the coil 42 as the S-pole and the lower side as the N-pole are generated alternately and periodically.

In the first electric field, the movable plate 21 rotates around the axis line a counter-clockwise in FIG. 2 so that the N-pole side of the permanent magnet 41 may be attracted toward the coil 42 and the S-pole side may move away from the coil 42 (first state). On the other hand, in the second electric field, the movable plate 21 rotates around the axis line a clockwise in FIG. 2 so that the S-pole side of the permanent magnet 41 may be attracted toward the coil 42 and the N-pole side may move away from the coil 42 (second state). These first state and second state are alternately repeated, and the movable plate 21 rotates around the axis line a.

Manufacturing Method of Actuator

The light scanner 1 having the above described configuration may be manufactured in the following manner. As below, as an example of the manufacturing method of the actuator of the invention, a manufacturing method of the light scanner 1 will be explained with reference to FIGS. 5A to 9D. Further, FIGS. 5A to 7G are shown in sections corresponding to FIG. 2 and FIGS. 8A to 9D are shown in sections corresponding to FIG. 4.

The manufacturing method of the light scanner 1 has a process of forming the base 2.

The process of forming the base 2 has step [A] of forming a recessed part 212 and step [B] of forming the movable plate 21, the support part 22, and the pair of connection parts 23, 24.

As below, the respective steps will be sequentially explained in detail.

A Step of Forming Recessed Part 212

A1

Figure 5A:
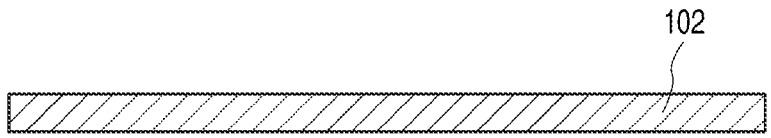
FIGS. 5A to 5G are sectional views for explanation of a manufacturing method of the light scanner shown in FIG. 1.

First, as shown in FIG. 5A, a silicon substrate 102 is prepared.

The silicon substrate 102 becomes the base 2 through etching, which will be described later.

Specifically, the silicon substrate 102 has its principal surface formed by the (100) surface of silicon.

A2

Figure 5B:
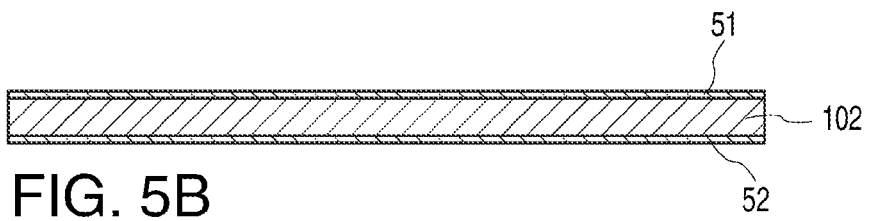

Then, as shown in FIG. 5B, a nitride film 51 is formed on the upper surface of the silicon substrate 102 and a nitride film 52 is formed on the lower surface of the silicon substrate 102.

The nitride films 51, 52 respectively include SiN, for example.

Further, the methods of forming the nitride films 51, 52 are respectively not particularly limited, however, for example, vapor-phase deposition such as plasma CVD may be used.

Furthermore, the thicknesses of the nitride films 51, 52 are not particularly limited, however, may be about 0.01 µm to 0.2 µm.

Note that, in place of the nitride films 51, 52, oxide films including SiO may be formed by thermal oxidation, for example.

A3

Figure 5C:
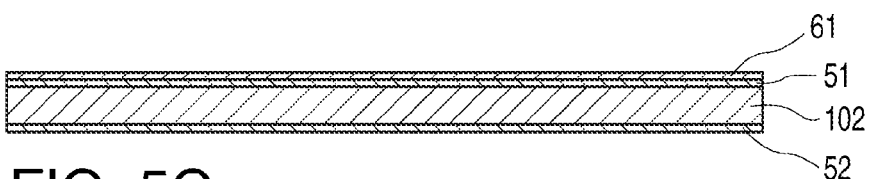
Figure 5D:
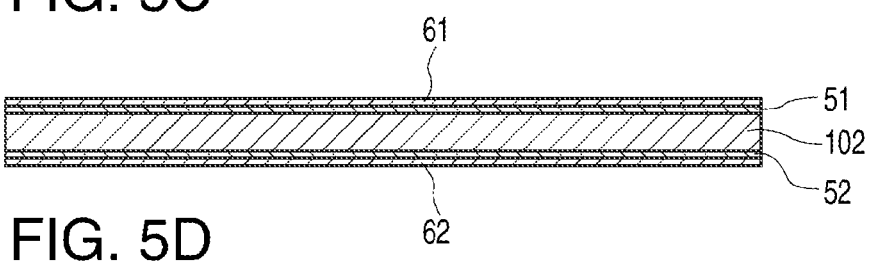

Then, as shown in FIG. 5C, a resist film 61 is formed on the nitride film 51, and, as shown in FIG. 5D, a resist film 62 is formed on the nitride film 52.

The resist films 61, 62 include positive-type or negative-type resist materials, respectively.

A4

Figure 5E:
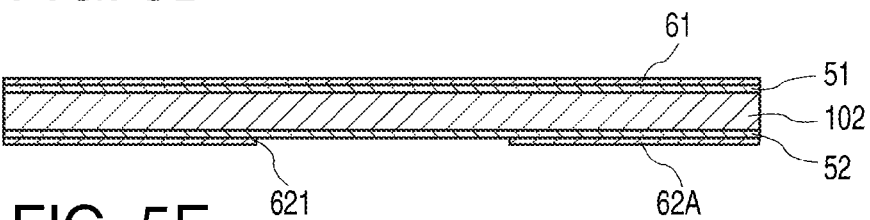

Then, by exposing the resist film 62 to light and developing it, the part corresponding to the formation region of the recessed part 212 of the resist film 62 is removed. Thereby, as shown in FIG. 5E, a resist film 62A having an opening 621 is obtained.

A5

Figure 5F:
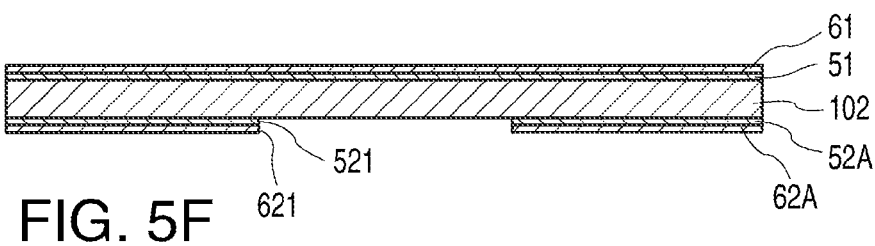

Then, using the resist film 62A as a mask, a part of the nitride film 52 is removed by etching. Thereby, as shown in FIG. 5F, a nitride film 52A having an opening 521 is obtained.

As the etching (the method of forming the opening 521), not particularly limited, but, for example, reactive ion etching (RIE), dry etching using $CF_4$, or the like may be used.

A6

Figure 5G:
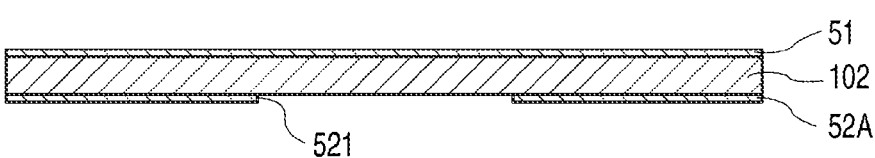

Next, the resist films 61, 62A are removed. Thereby, as shown in FIG. 5G, the upper surface of the silicon substrate 102 is covered by the nitride film 51 and the lower surface is covered by the nitride film 52A.

As the method of removing the resist films 61, 62, not particularly limited, but, for example, cleansing using sulfuric acid, $O_2$ ashing, or the like may be used.

A7

Then, using the nitride film 52A as a mask, the silicon substrate 102 is etched. Thereby, as shown in FIG. 6A, a silicon substrate 102A having the recessed part 212 is obtained.

As the etching (the method of forming the recessed part 212), not particularly limited, but anisotropic etching may be preferably used like the etching for forming the movable plate 21, the support part 22, etc., which will be described later.

The anisotropic etching may be performed by wet etching using KOH solution, for example, but not particularly limited.

A8

Next, the nitride films 51, 52A are removed. Thereby, as shown in FIG. 6B, the upper surface and the lower surface of the silicon substrate 102A are exposed.

As the method of removing the nitride films 51, 52A, not particularly limited, but, for example, reactive ion etching (RIE), dry etching using $CF_4$, or the like may be used like at step A5.

B Step of Forming Movable Plate 21, Support Part 22, Etc.

B1

Next, as shown in FIG. 6C, a nitride film 71 is formed on the upper surface of the silicon substrate 102A and a nitride film 72 is formed on the lower surface of the silicon substrate 102A.

The nitride films 71, 72 respectively include SiN, for example.

Further, the methods of forming the nitride films 71, 72 are respectively not particularly limited, however, for example, vapor-phase deposition such as plasma CVD may be used like at step A2.

Furthermore, the thicknesses of the nitride films 71, 72 are not particularly limited, however, may be about 0.01 µm to 0.3 µm.

Note that, in place of the nitride films 71, 72, oxide films including SiO may be formed by thermal oxidation, for example.

B2

Then, as shown in FIG. 6D, a resist film 81 is formed on the nitride film 71.

The resist film 81 includes a positive-type or negative-type resist material.

B3

Then, by exposing the resist film 81 to light and developing it, a part of the resist film 81 is removed so that the parts corresponding to the formation regions of the movable plate 21, the support part 22, and the pair of connection parts 23, 24 may be left. Thereby, as shown in FIG. 6E, a resist film 81A having openings 811 is obtained. Note that, though not shown in FIG. 6E, an opening formed to correspond to the gap between the upper ends of the pair of beam members 231, 232 is also formed in the resist film 81A.

B4

Then, using the resist film 81A as a mask, parts of the nitride film 71 are removed by etching. Thereby, as shown in FIG. 6F, a nitride film 71A having openings 711 is obtained. Note that, though not shown in FIG. 6F, an opening formed to correspond to the gap between the upper ends of the pair of beam members 231, 232 is also formed in the nitride film 71A.

As the etching (the method of forming the openings 711), not particularly limited, but, for example, reactive ion etching (RIE), dry etching using $CF_4$, or the like may be used like at step A5.

B5

Next, the resist film 81A is removed. Thereby, as shown in FIG. 6G, the upper surface of the silicon substrate 102A is covered by the nitride film 71A and the lower surface is covered by the nitride film 72.

As the method of removing the resist film 81A, not particularly limited, but, for example, cleansing using sulfuric acid, $O_2$ ashing, or the like may be used.

B6

Then, as shown in FIG. 7A, a resist film 82 is formed on the nitride film 72.

The resist film 82 includes a positive-type or negative-type resist material.

B7

Then, by exposing the resist film 82 to light and developing it, a part of the resist film 82 is removed so that the parts corresponding to the formation regions of the movable plate 21, the support part 22, and the pair of connection parts 23, 24 may be left. Thereby, as shown in FIG. 7B, a resist film 82A having openings 821 is obtained. Note that, though not shown in FIG. 7B, an opening formed to correspond to the gap between the lower ends of the pair of beam members 231, 232 is also formed in the resist film 82A.

B8

Then, using the resist film 82A as a mask, parts of the nitride film 72 are removed by etching. Thereby, as shown in FIG. 7C, a nitride film 72A having openings 721 is obtained. Note that, though not shown in FIG. 7C, an opening formed to correspond to the gap between the lower ends of the pair of beam members 231, 232 is also formed in the nitride film 72A.

As the etching (the method of forming the openings 721), not particularly limited, but, for example, reactive ion etching (RIE), dry etching using $CF_4$, or the like may be used like at step A5.

B9

Next, the resist film 82A is removed. Thereby, as shown in FIG. 7D, the upper surface of the silicon substrate 102A is coveted by the nitride film 71A and the lower surface is covered by the nitride film 72A.

As the method of removing the resist film 82A, not particularly limited, but, for example, cleansing using sulfuric acid, $O_2$ ashing, or the like may be used.

B10

Then, using the nitride films 71A, 72A as masks, the silicon substrate 102A is anisotropically etched. Thereby, as shown in FIG. 7E, the base 2 is obtained. That is, in the anisotropic etching at the step, the silicon substrate 102A is anisotropically etched from both surface sides via the nitride film 72A as a first mask and the nitride film 71A as a second mask, and thereby, the movable plate 21, the support part 22, and the pair of connection parts 23, 24 are formed.

The anisotropic etching (the method of forming the base 2) may be performed by wet etching using KOH solution, for example, but not particularly limited.

Here, the formation of the connection part 23 by the anisotropic etching will be described in detail. The formation of the connection part 24 is the same as the formation of the connection part 23, and the explanation will be omitted.

As shown in FIGS. 8A to 8D, the nitride film 71A used as the mask (second mask) has a part 712 formed to correspond to the formation region of the upper surface of the beam member 231 of the connection part 23 and a part 713 formed to correspond to the formation region of the upper surface of the beam member 232 of the connection part 23, and an opening (second opening) 714 is formed between the part 712 and the part 713. The opening 714 is formed to correspond to the gap between the upper ends of the pair of beam members 231, 232.

Further, the nitride film 72A used as the mask (first mask) has a part 722 formed to correspond to the formation region of the lower surface of the beam member 231 of the connection part 23 and a part 723 formed to correspond to the formation region of the lower surface of the beam member 232 of the connection part 23, and an opening (first opening) 724 is formed between the part 722 and the part 723. The opening 724 is formed to correspond to the gap between the lower ends of the pair of beam members 231, 232.

Here, given that a width of the opening 724 is $W_{m1}$ and a thickness of the silicon substrate 102A is T, a relation of the following expression (3) is satisfied.

$$W_{m1} < \frac{T}{\tan 54.73°} \quad (3)$$

If the relational expression is satisfied, the positional relationship between the nitride film 72A used as the first mask and the nitride film 71A used as the second mask is misaligned, and thereby, even if level differences are produced on the pair of side surfaces that should be formed by the (111) surfaces of silicon of the respective beam members 231, 232, the level difference formed on one side surface and the level difference formed on the other side surface may be shifted in the thickness direction of the silicon substrate. Accordingly, in the obtained actuator, stress concentration generated in the respective beam members 231, 232 at rotation of the movable plate 21 may be relaxed.

Given that a width of the opening 714 is $W_{m2}$, the following expression (4) is satisfied.

$$T < \frac{\tan 54.73°}{2}(w_{m1} + w_{m2}) \quad (4)$$

Thereby, the silicon substrate 102A having the plate surface formed by the (100) surface of silicon is anisotropically etched from both surface sides, and the connection part 23 including the pair of beam members 231, 232 may be easily and reliably formed.

As below, production of level differences in the anisotropic etching at the step will be described in detail.

At anisotropic etching at the step, when the formation positions of the nitride films 71A, 72A used as masks are aligned, as shown in FIGS. 8A to 8D, the upper surface of the silicon substrate 102A is etched via the openings 711, 714 and the lower surface of the silicon substrate 102A is etched via the openings 721, 724, and the pair of beam members 231, 232 are formed.

Figure 8A:
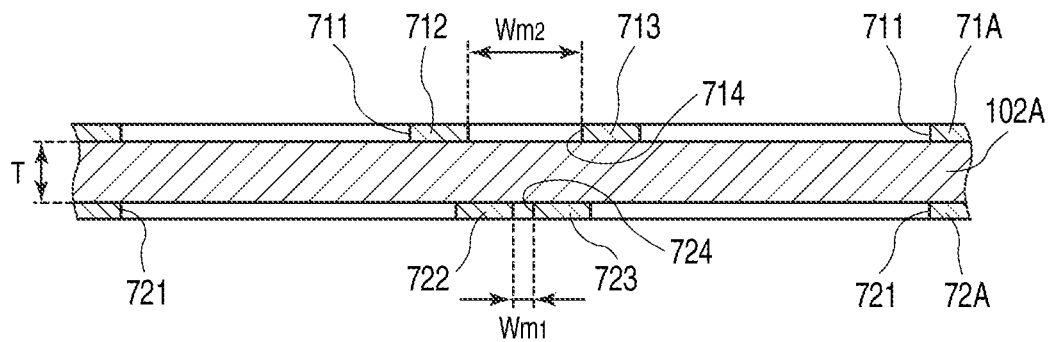
FIGS. 8A to 8D are diagrams for explanation of formation of connection parts (without misalignment of masks) at etching step shown in FIG. 7E.
Figure 8B:
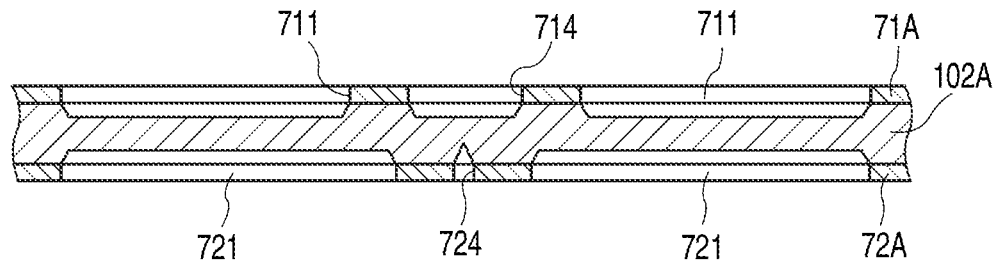
Figure 8C:
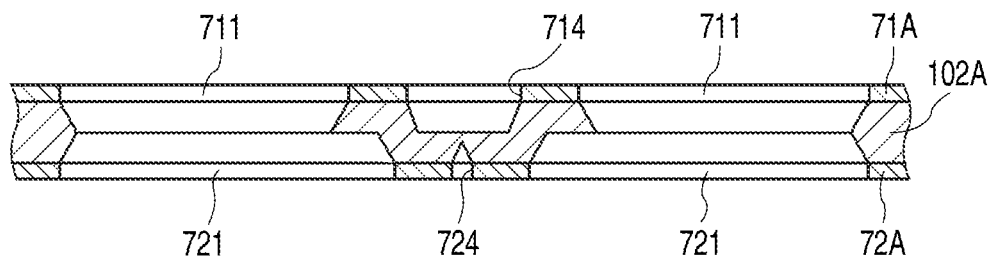
Figure 8D:
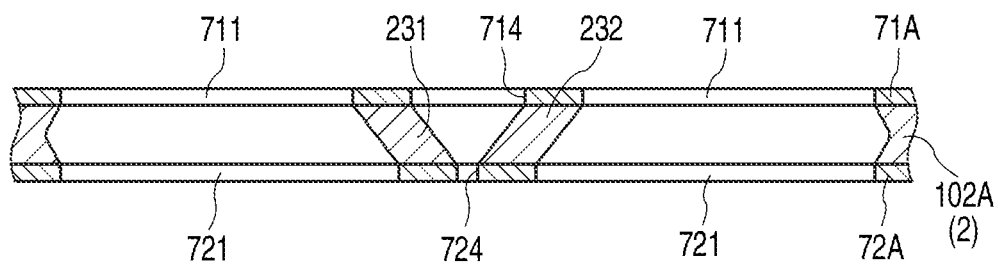

In this case, the center positions of the opening 714 and the opening 724 in the width direction are the same with each other in the width direction, and thus, as shown in FIG. 8D, the respective side surfaces of the respective beam members 231, 232 are constantly inclined surfaces formed by the (111) surfaces of silicon without level difference.

On the other hand, at anisotropic etching at the step, when the formation positions of the nitride films 71A, 72A used as masks are misaligned, as shown in FIGS. 9A to 9D, the upper surface of the silicon substrate 102A is etched via the openings 711, 714 and the lower surface of the silicon substrate 102A is etched via the openings 721, 724, and the pair of beam members 231, 232 are formed.

Figure 9A:
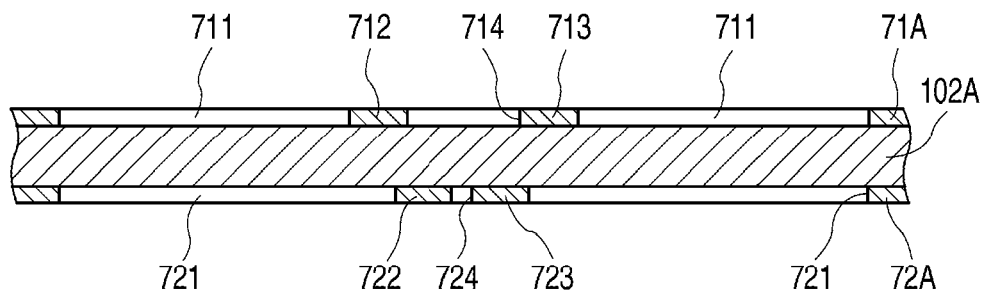
FIGS. 9A to 9D are diagrams for explanation of formation of connection parts (with misalignment of masks) at etching step shown in FIG. 7E.
Figure 9B:
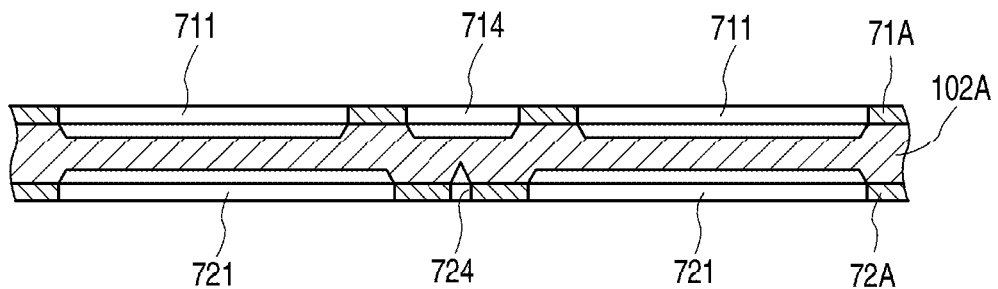
Figure 9C:
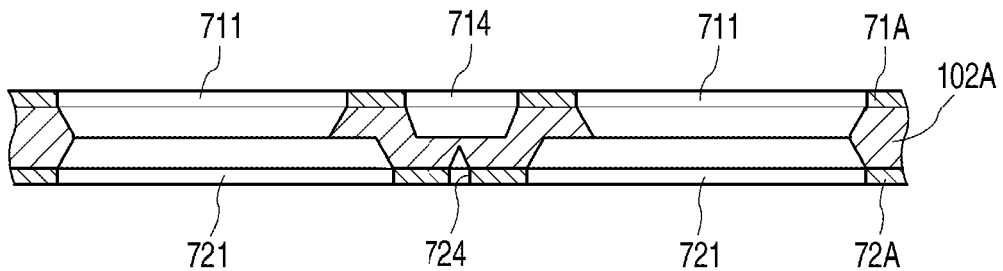
Figure 9D:
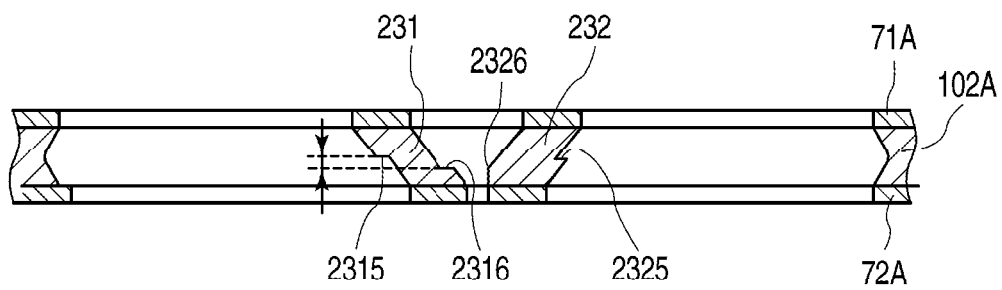

In this case, the center positions of the opening 714 and the opening 724 in the width direction are different from each other in the width direction, and thus, as shown in FIG. 9D, a level difference 2315 is formed on one side surface of the beam member 231 and a level difference 2316 is formed on the other side surface of the beam member 231. Further, similarly, a level difference 2325 is formed on one side surface of the beam member 232 and a level difference 2326 is formed on the other side surface of the beam member 232.

Since the width of the opening 724 of the nitride film 72A used as the mask is formed to satisfy the above described expression (3), the level difference 2316 is formed nearer the nitride film 72A side (lower side) than the center in the thickness direction of the silicon substrate 102A.

On the other hand, since the widths of the opening 711 of the nitride film 71A and the opening 721 of the nitride film 72A are too large compared to the thickness of the silicon substrate 102A, the level difference 2315 is formed at the center in the thickness direction of the silicon substrate 102A.

Accordingly, the level difference 2315 and the level difference 2316 are in the different positions in the thickness direction of the silicon substrate 102A. Similarly, the level difference 2325 and the level difference 2326 are in the different positions in the thickness direction of the silicon substrate 102A.

As described above, the level difference 2315 and the level difference 2316 are in the different positions in the thickness direction of the silicon substrate 102A, and thus, stress concentration on the center part in the thickness direction of the beam member 231 at rotation of the movable plate 21 may be prevented or suppressed. Similarly, stress concentration on the center part in the thickness direction of the beam member 232 at rotation of the movable plate 21 may be prevented or suppressed. As a result, breakage of the connection part 23 due to stress concentration at driving may be prevented. Similarly, breakage of the connection part 24 due to stress concentration at driving may be prevented.

If the width of the opening 724 does not satisfy the expression (3), all of the level differences 2315, 2316, 2325, 2326 are formed at the center in the thickness direction of the silicon substrate 102A. That is, the level differences 2315, 2316, 2325, 2326 are in the same positions with each other in the thickness direction of the silicon substrate 102A. Accordingly, breakage due to stress concentration at driving may occur.

B11

Figure 7F:
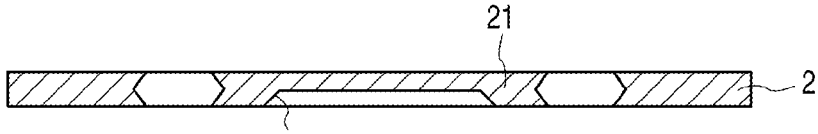

Next, the nitride films 71A, 72A are removed. Thereby, as shown in FIG. 7F, the upper surface and the lower surface of the base 2 are exposed.

As the method of removing the nitride films 71A, 72A, not particularly limited, but, for example, reactive ion etching (RIE), dry etching using $CF_4$, wet process using thermal phosphoric acid or the like may be used like at step A5.

Figure 7G:
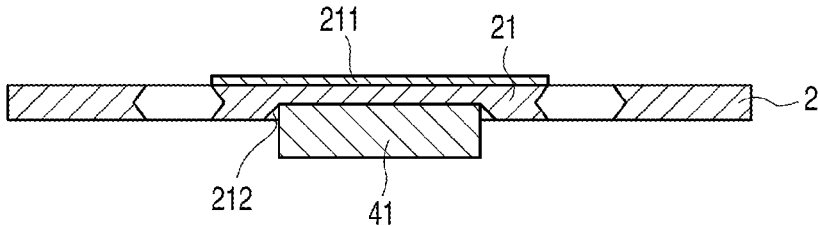

Then, as shown in FIG. 7G, the permanent magnet 41 is fixed to the lower surface of the movable plate 21 via an adhesive agent. Note that, a hard magnetic material may be fixed to the lower surface of the movable plate 21 via an adhesive agent, and then, the hard magnetic material may be magnetized to form the permanent magnet 41.

Further, a metal film is formed and the light reflection part 211 is formed on the upper surface of the movable plate 21. As the method of forming the metal film, not particularly limited, but vacuum evaporation, sputtering (cold sputtering), dry plating such as ion plating, wet plating such as electrolytic plating or electroless plating, spraying, bonding of metal foils, or the like may be used.

Furthermore, though not shown in the drawing, the coil 42 is provided on the support 3 and the support 3 and the base 2 are bonded.

Through the above described steps, the light scanner 1 is obtained.

According to the above described manufacturing method of the light scanner 1, since the expression (3) is satisfied, in the obtained light scanner 1 (actuator), stress concentration caused in the respective beam members 231, 232, 241, 242 at rotation of the movable plate 21 may be relaxed.

The above explained light scanner may be preferably applied to image forming apparatuses such as a projector, a laser printer, a display for imaging, a barcode reader, and a scanning confocal microscope. As a result, image forming apparatuses having advantageous drawing characteristics may be provided.

Image Forming Apparatus

Here, an example of an image forming apparatus of the invention will be explained with reference to FIG. 10.

Figure 10:
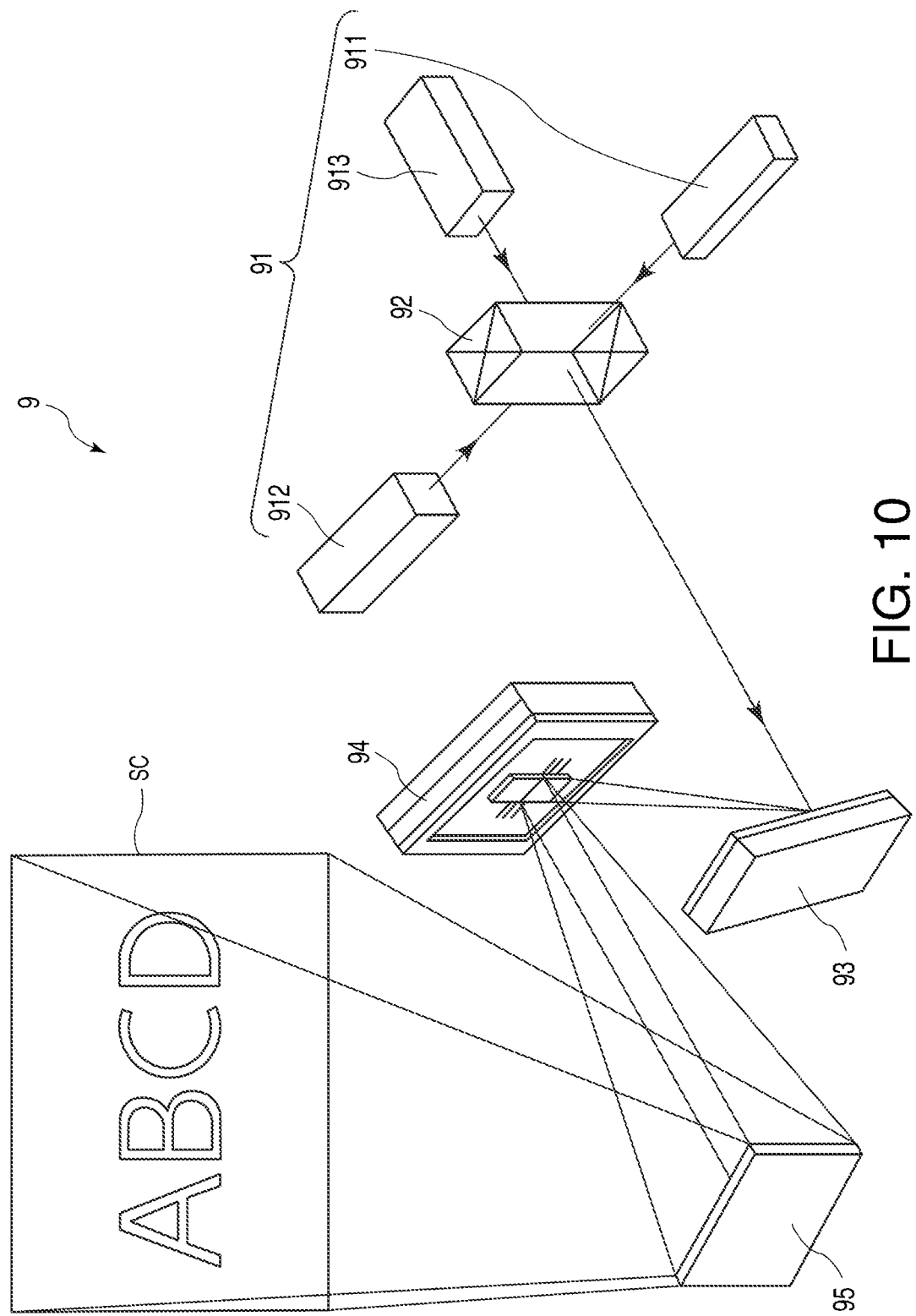
FIG. 10 is a schematic diagram showing an example of a configuration of an image forming apparatus according to the invention.

FIG. 10 is a schematic diagram showing an example of a configuration of an image forming apparatus of the invention. Hereinafter, for convenience of explanation, the longitudinal direction of a screen SC is referred to as "horizontal direction" and the direction orthogonal to the longitudinal direction is referred to as "vertical direction".

A projector 9 has alight source unit 91 that outputs light such as laser, a cross dichroic prism 92, and a pair of the light scanners 93, 94 according to the invention (for example, the light scanner 1 and a light scanner having the same configuration), and a fixed mirror 95.

The light source unit 91 includes a red light source 911 that outputs red light, a blue light source 912 that outputs blue light, and a green light source 913 that outputs green light.

The cross dichroic prism 92 is an optical device that is formed by bonding four right angle prisms and combines lights radiated from the red light source 911, the blue light source 912, and the green light source 913.

The projector 9 combines the lights respectively radiated from the red light source 911, the blue light source 912, and the green light source 913 based on image information from a host computer (not shown) using the cross dichroic prism 92, the combined light is used for scanning by the light scanners 93, 94, further reflected by the fixed mirror 95, and form a color image on the screen SC.

Here, the light scanning of the light scanners 93, 94 will be specifically explained.

First, the light combined by the cross dichroic prism 92 is used for horizontal scanning (main scanning) by the light scanner 93. Then, the light used for the scanning in the horizontal direction is further used for vertical scanning (sub-scanning) by the light scanner 94. Thereby, a two-dimensional color image may be formed on the screen SC. Using the light scanner according to the embodiment of the invention as the light scanners 93, 94, extremely advantageous drawing characteristics may be exerted.

Note that, the projector 9 is not limited to that as long as it is adapted to perform scanning with light by the light scanner and form an image on an object, but, for example, the fixed mirror 95 may be omitted.

The image forming apparatus is advantageous in reliability because the light scanners 93, 94 may be reliably driven over a long period.

Thus far, the actuator, the manufacturing method of the actuator, the light scanner, and the image forming apparatus according to the invention have been explained according to the shown embodiments, however, the invention is not limited to those. For example, in the actuator, the light scanner, and the image forming apparatus according to the invention, the configurations of the respective parts may be replaced by arbitrary configurations having the same functions, and arbitrary configurations may be added.

Further, in the above described embodiments, the case where the actuator according to the invention is applied to the light scanner has been explained as an example, however, the actuator according to the invention is not limited to the case, but may be applied to another optical device such as an optical switch or an optical attenuator, for example.

Furthermore, in the above described embodiments, the configuration in which the driving unit for rotating the movable plate employs the moving-magnet-type electromagnetic system has been explained as an example, however, the driving unit may employ a moving-coil-type electromagnetic system, or may employ a driving system other than the electromagnetic system such as an electrostatic driving system or a piezoelectric driving system.

The entire disclosure of Japanese Patent Application No. 2010-256243, filed Nov. 16, 2010 is expressly incorporated by reference herein.

What is claimed is:

1. An actuator comprising:
    a movable part rotatable around a rotation center axis, the movable part having movable top and movable bottom surfaces opposite to each other, the movable top surface extending in a first direction;
    a pair of connection parts connected to the movable part, the pair of connection parts having connection top and connection bottom surfaces; and
    a support part that supports the pair of connection parts, wherein
    the movable part is in a cross shape in a plan view,
    the movable bottom surface has a recess, a recess bottom surface of the recess is located between the movable top surface and the movable bottom surface, and a permanent magnet is located on the recess bottom surface,
    each of the connection parts includes a pair of beam members,
    a beam distance between the pair of beam members gradually increases from the connection bottom surface toward the connection top surface when seen from a direction in parallel to the rotation center axis of the movable part,
    each of the beam members has inner and outer side surfaces between the connection top surface and the connection bottom surface, and one of the inner and outer surfaces having two inclined surfaces that incline with respect to the first direction, the two inclined surfaces extending in the same direction, and
    given that a first distance between ends at the connection bottom surface of the pair of beam members is $W_1$ and a thickness of the pair of beam members in the thickness direction of the movable part is t, the following expression (1) is satisfied $$w_1 < \frac{t}{\tan 54.73°}. \tag{1}$$

2. The actuator according to claim 1, wherein, given that a second distance between ends at the connection top surface of the pair of beam members is $W_2$, the following expression (2) is satisfied $$t < \frac{\tan 54.73°}{2}(w_1 + w_2). \tag{2}$$

3. The actuator according to claim 1, wherein the movable part, the support part, and the pair of connection parts are formed by anisotropic etching of a silicon substrate having a plate surface formed by a (100) crystal surface of silicon.

4. The actuator according to claim 3, wherein each of the beam members has a sectional shape of a parallelogram when seen from the direction in parallel to the rotation center axis.

5. The actuator according to claim 4, wherein an outer shape of the sectional shape of each of the beam members is formed by a pair of top and bottom sides along the (100) crystal surface of silicon and the inner and outer side surfaces along a (111) crystal surface of silicon.

* * * * *